Patented July 28, 1936

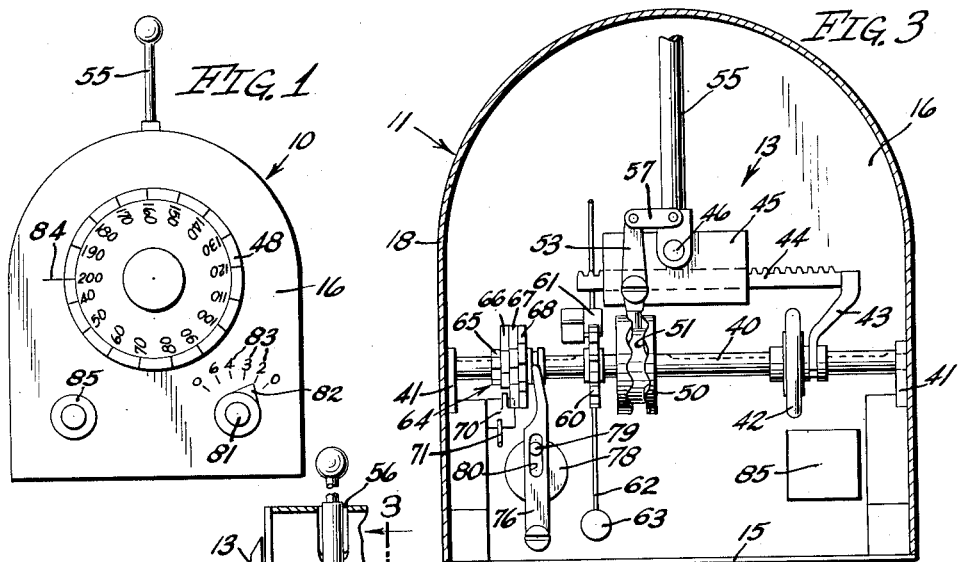

2,048,881

UNITED STATES PATENT OFFICE 2,048,881

METRONOME

James H. Morrison, Los Angeles, Calif.

Application October 10, 1934, Serial No. 747,713

4 Claims. (Cl. 58—130)

My invention relates to metronomes and particularly to an electrically driven metronome. The metronomes in use at present are driven by spring motors and must be manually wound from time to time. An object of my invention is to provide an electrically driven metronome thus eliminating the necessity of winding a spring motor.

In order to change the meter of the spring driven instruments it is necessary to stop the pendulum thereof, make the adjustment and restart the pendulum. Another object of my invention is to provide a metronome in which the meter can be readily changed without stopping the mechanism thereof.

Further objects and advantages will be made manifest in the following description taken in connection with the accompanying drawing in which:

Fig. 1 is a front elevational view of a preferred embodiment of my invention.

Fig. 2 is an enlarged side elevational view of the device, a portion of the housing being broken away to disclose the mechanism thereof.

Fig. 3 is a vertical sectional view taken on the line 3—3 of Fig. 2.

Fig. 4 is a fragmentary vertical sectional view taken on the line 4—4 of Fig. 2.

Referring specifically to the drawing, a metronome 10 comprising a preferred embodiment of my invention, includes a housing 11, a power unit 12 and a signal mechanism 13.

The housing 11 includes a base plate 15, front and rear end plates 16 and 17 respectively and a cover plate 18.

The power unit 12 includes a speed reduction unit 19 and a synchronous electric motor 20 the latter having a field magnet 21 and a field coil 22. Fixed to the magnet 21 are plates 23 having bearings 24 thereon, the latter supporting a shaft 25 having a rotor (not shown) thereon. The motor 20 is rockably supported within the housing 11 by plates 27 fixed to the field magnet 21. Extending through suitable apertures provided in the lower ends of the plates 27 is a pin 28, opposite ends of the latter being received by blocks 29 on the base plate 15. Coiled about the pin 28 is a torsion spring 30 which tends to urge the motor 20 leftward as viewed in Fig. 2. The speed reduction unit 19, mounted on the motor 20, carries a disc 33. Included in the unit 19 are suitable gears (not shown) for transmitting rotation of the motor shaft 25 to the disc 33, the latter being driven at a relatively low speed.

The signal unit 13, shown clearly in Fig. 3 includes a splined shaft 40. Keyed to and slidable on the shaft 40 is a friction wheel 42 which is carried along the shaft 40 by a yoke arm 43 and a rack 44 the latter being slidably supported in a block 45 mounted on the front plate 16 of the housing 11. Rotatably mounted in the block 45 and extending through the plate 16 is a shaft 46 to which a pinion 47 is keyed, the pinion 47 meshing with the rack 44. Fixed on the outer end of the shaft 46 is a manually operated calibrated dial 48. Fixed on the shaft 40 is a drum 50 formed to provide a corrugated channel 51. Pivotally mounted on the block 45 in vertical alignment with the drum 50 is a lever 53, the lower end of which extends into the channel 51 of the drum 50. Pivoted at its lower end on the inner end of the aforementioned shaft 46 is an oscillating arm 55 which extends above the housing 11 through a suitable slot 56 provided in the cover 18. The lower portion of the arm 55 is hollow so as to slidably receive the upper portion thereof thus permitting the arm 55 to be collapsed to facilitate packing the metronome 10 and to protect the arm 55 when the instrument 10 is not in use. Connected at its opposite ends to the lever 53 and the arm 55 is a link 57 as seen in Fig. 3.

Fixed on the shaft 40 adjacent the drum 50 is a toothed wheel 60. Pivotally mounted on the front plate 16 in radial alignment with the wheel 60 is a lug 61, the latter carrying a spring wire finger 62 to the lower end of which a hammer 63 is fixed.

Keyed to and slidable on the shaft 40 between the wheel 60 and the bearing 41 is a toothed wheel unit 64 comprising four toothed wheels 65, 66, 67 and 68 having 2, 3, 4 and 6 teeth respectively. Pivotally mounted on the plate 16 adjacent the unit 64 is a lug 70 carrying a spring wire finger 71 to the end of which a hammer 72 is fixed as seen in Fig. 2. Mounted on the base plate 15 is a bracket 73 to which a bell 74 is secured, the latter being in position to be struck by the hammer 72. The unit 64 is shifted along the shaft 40 by a yoke arm 76 which is pivoted on the plate 16 at its lower end. Rotatably mounted on the plate 16 is a shaft 77 having a disc 78 on the inner end thereof. Fixed to the disc 78 is a pin 79 which extends into a suitable slot 80 in the yoke arm 76. Provided on the outer end of the shaft 77 is a knurled head 81 having a pointer 82 thereon. Marked on the front of the plate 16 about the pointer 82 are calibrations 83 and a single mark 84 adjacent the dial 48.

Mounted on the plate 16 is a switch 85 for turning the motor 20 on or off.

Operation

When the motor 20 is energized the disc 33 is driven at a relatively slow speed and by contact with the wheel 42, causes the shaft 40 to rotate. The oscillating arm 55 is continually actuated by the drum 50, it being clear that the lower end of the lever 53 follows the corrugated channel 51 of the drum 50 causing the lever 53 to oscillate, this movement being transmitted to the arm 55 by the link 57. As the arm 55 is oscillated the toothed wheel 60 intermittently trips the lug 61 causing the hammer 63 to strike the front plate 16. The toothed wheel 60 and the drum 50 are timed so that the hammer 63 will strike the plate 16 at the time the arm 55 reaches the end of each of its oscillations. By rotating the knob 81 any one of the toothed wheels 65, 66, 67 and 68 of the unit 64 may be positioned opposite the lug 70 causing the hammer 72 to strike the bell 74 at the same time that the hammer 63 strikes the second, third, fourth or sixth beat of each series of six beats. By rotating the dial 48 any one of the calibrations thereon may be brought in alignment with the mark 84 to obtain the same number of oscillations of the arm 55 as indicated on the selected calibration of the dial 48. It is clear that rotation of the dial 48 causes the pinion 47 to slide the rack 44 in the block 45 and carry the wheel 42 into proper relationship with the face of the disc 33.

It is thus clear that I have provided a simple form of electrically operated metronome in which visible as well as audible signals may be had, and in which certain of the aforementioned signals may be accentuated to indicate the beats for designating 2—4, 3—4, 4—4 or 6—8 time. Although I have shown and described but one preferred form of my invention it is to be understood that various modifications and changes might be made therein without departing from the spirit of the invention or the scope of the appended claims.

I claim as my invention:

1. In a metronome, the combination of: a housing; a splined shaft rotatably mounted in said housing; a wheel keyed to said shaft and slidable thereon; a power unit in said housing; a disc mounted on and driven by said power unit, said power unit being pivotally mounted with the face of said disc contacting the periphery of said wheel; a spring urging said power unit about said pivot causing said disc to be urged against said wheel; means for sliding said wheel to any desirable position in relation to said disc to vary the speed of said shaft; and means responsive to rotation of said shaft to mark equally timed, audible signals.

2. In a metronome, the combination of: a supporting structure; a driven wheel rotatably mounted on said structure; a power unit on said structure; a disc mounted on and driven by said power unit, said power unit being pivotally mounted on said supporting structure with the face of said disc in contact with the periphery of said driven wheel; spring means for urging said power unit about said pivot to yieldably press said disc against said wheel; means for shifting the relative position of said wheel and said disc to vary the speed of said wheel; and means responsive to rotation of said wheel to mark equally timed signals of any desired frequency.

3. In a metronome, the combination of: a housing having a substantially semi-circular top portion; a manually rotatable dial on the front of said housing, the axis of said dial being aligned with the axis of said semi-circular top portion; a tempo indicating arm extending through a suitable slot provided in said semi-circular top, said arm being pivoted within said housing at a point in axial alignment with the axis of said dial; power means including a variable speed transmission in said housing for oscillating said arm; and control means responsive to rotation of said dial to control said transmission to determine the rate of oscillation of said arm.

4. In a metronome, the combination of: a housing having a semi-circular top portion; a horizontal shaft on the front of said housing, said shaft being rotatably mounted in axial alignment with the center of the arc of said top portion; a manually controlled dial on said shaft outside of said housing; a tempo indicating arm pivotally mounted on said shaft inside of said housing, said arm extending through a slot provided in the semi-circular top of said housing; power means including a variable speed transmission for oscillating said arm; and control means responsive to rotation of said dial for controlling said transmission to regulate the rate of oscillation of said arm.

JAMES H. MORRISON.